March 28, 1967  F. H. HOLLAND ET AL  3,311,794
ELECTRICAL INTERLOCK CONTROL CIRCUIT
Filed Oct. 22, 1963  4 Sheets-Sheet 1

CAM LIMIT SWITCH SEQUENCE

– DENOTES CLOSED CONTACTS

INVENTORS
FRANK H. HOLLAND
JOHN F. HOLLAND
BY
Andrus & Starke
Attorneys

INVENTORS
FRANK H. HOLLAND
JOHN F. HOLLAND
BY
Andrus & Starke
Attorneys

INVENTORS
FRANK H. HOLLAND
JOHN F. HOLLAND
BY
Andrus & Starke
Attorneys

United States Patent Office 3,311,794
Patented Mar. 28, 1967

3,311,794
ELECTRICAL INTERLOCK CONTROL CIRCUIT
Frank H. Holland and John F. Holland, Cleveland, Ohio, assignors, by mesne assignments, to A. O. Smith Corporation, Milwaukee, Wis., a corporation of New York
Filed Oct. 22, 1963, Ser. No. 318,025
21 Claims. (Cl. 317—135)

This invention relates to an electrical interlock control circuit and particularly to such circuit for maintaining safe cyclical operation of a punch press and like devices.

Punch presses employ separable dies for forming of metal members which may be of varied sizes and types. The dies are cyclically opened and closed to place work members therein and to form the work member. A drive motor is coupled by various means to a press shaft for positioning of the dies. A friction brake is generally used to stop and hold the press shaft. In one type, a continuously running motor drives a flywheel which is engaged and disengaged from the press shaft through a suitable air operated clutch or the like to cylically open and close the dies. An air pilot valve is utilized to control the flow of air from an air source to the clutch and friction brake with an electrically actuated unit such as a contactor or relay controlling the position of the air valve.

An eddy current clutch and brake performing the same functions as the air operated clutch and brake may also be employed. An electrically actuated unit controls the eddy current brake and clutch. A friction brake may also be provided to assist in the stopping and to positively hold the press in the stop position.

A further type of punch press is a direct connected press wherein the driving motor is conected directly to the press ram to cyclically actuate the press dies. The movement of the dies is directly controlled by the starting and stopping of the motor normally through an electrically actuated starter unit. A similar electrical control circuit can be used for the several types of presses and the present invention is particularly directed to providing improved safety control in such circuits.

In the normal operation of the presses, the operating personnel are required to place their arms or hands between the separated dies of the press to remove and feed material to the press as well as for removing the punch parts from the press. More recently, automatic mechanical means have been provided, normally identified as iron arms, for removing of the finished parts and inserting of new material. Such items are however relatively expensive. Presses therefore either present a potential danger to the operating personnel where they are manually controlled or to the mechanical equipment if automatically loaded if the control equipment should malfunction for any reason and cause the press to operate when it should be in a stopped position.

As a result of the above possibilities, any electrical control circuit for a punch press preferably provides maximum safety to personnel or the loading equipment while maintaining a maximum production rate. One standard form of protection heretofore employed has been the use of control circuits which requires the operator to maintain both of his hands on separate push button units during the time that the press ram is moving downwardly to engage the dies and thus in the more dangerous direction. For example, such a control is illustrated in U.S. Patent 2,299,007. However, it was found that the provision of a control circuit with the separated push buttons operated by the individual hands of the operators were not completely protective against changes made by the operators themselves in order to increase their rate of production, nor were they completely capable of protecting against the malfunctioning of the components.

An improved control circuit having a variety of safety features is disclosed in the copending application of Frank H. Holland, entitled Electrical Control Circuits, which was filed on May 5, 1961, with Ser. No. 123,603, now Patent No. 3,183,337, and assigned to a common assignee herewith. As disclosed therein, each of the path buttons includes a normally closed and a normally open set of switch contacts. The interlocking control requires that the operator maintain both hands on the associated push buttons during the downward movement of the die units or the closing movement of the die assembly. Anti-repeat relays or contactors requiring a sequential operation in order to provide starting and normal cyclic operation of the press are connected in circuit with the push button switches. The circuit provided that the push buttons had to be released before the first circuit could be re-energized to initiate a second cycle of operation. If the operator just held his hand on the push button switches, limit switches would de-energize the press control circuit and prevent further operation of the press. Interlocking means were provided in the circuit such that if the normally open contacts of the push buttons were shorted, the interlock would prevent operation of the circuit. Limit switch controls also were provided such that certain of the limit switches or contacts operated improperly, the press would stop. Although this control circuit has proven to be highly practical, certain malfunctioning as well as tampering by the personnel to bypass the safety controls and increase production has been noted.

The present invention is directed to a control circuit which will protect against further component failure or disconnection of the safety features and will indicate the malfunctioning of the device in order to increase the protection afforded by the press control circuit. For example, in the prior control circuits, protection was normally not afforded for the malfunctioning of the normally closed contacts. The present invention provides such protection. Further, the present invention provides an interlocking fault control having a limited access manual reset positively opening the press circuit and requiring resetting under control of supervisory personnel, if desired. The energization of the fault relay is conjointly controlled by contacts or switches of the other relays in the control circuit to detect selected changes, whether intentional or accidental, in the circuit, such as the shorting of any of the push button switches.

Generally, the present invention employs a series of anti-repeat relays or contactors interconnected to control the main press control relay generally as in the previously referred to copending application of Frank H. Holland. However, in accordance with this invention, safety relays and a fault relay are provided and include contacts in circuit with the main press control relay to open the circuit to the press control relay to prevent operation in a dangerous manner. The control circuit thus provides an increased number of selected contacts connected in a novel manner to assure proper operation of the complete circuit while maintaining the flexibility and rapid production associated with other controls. The safety relays are preferably interconnected in the energizing circuit for the first anti-repeat relay and require that the circuit be operated in a proper sequence to prevent operation of the relays in a manner to actuate the fault control unit.

Normally, the present invention will permit what is generally known as "hopping" of the press. Thus, by a proper timed actuation of push buttons, the press control can be operated to maintain continuous operation of the press in a safe, reliable manner. However, the present invention provides very simple and ready means to prevent such operation, if desired for any reason.

The present invention is also readily adapted to multiple operator control of a press; for example, two or four as normally required in certain types of press sequences.

The drawings furnished herewith illustrate the best mode presently contemplated for carrying out the invention and in connection with the description thereof will disclose to those skilled in the art the many objects and advantages of the present invention.

Figure 1:
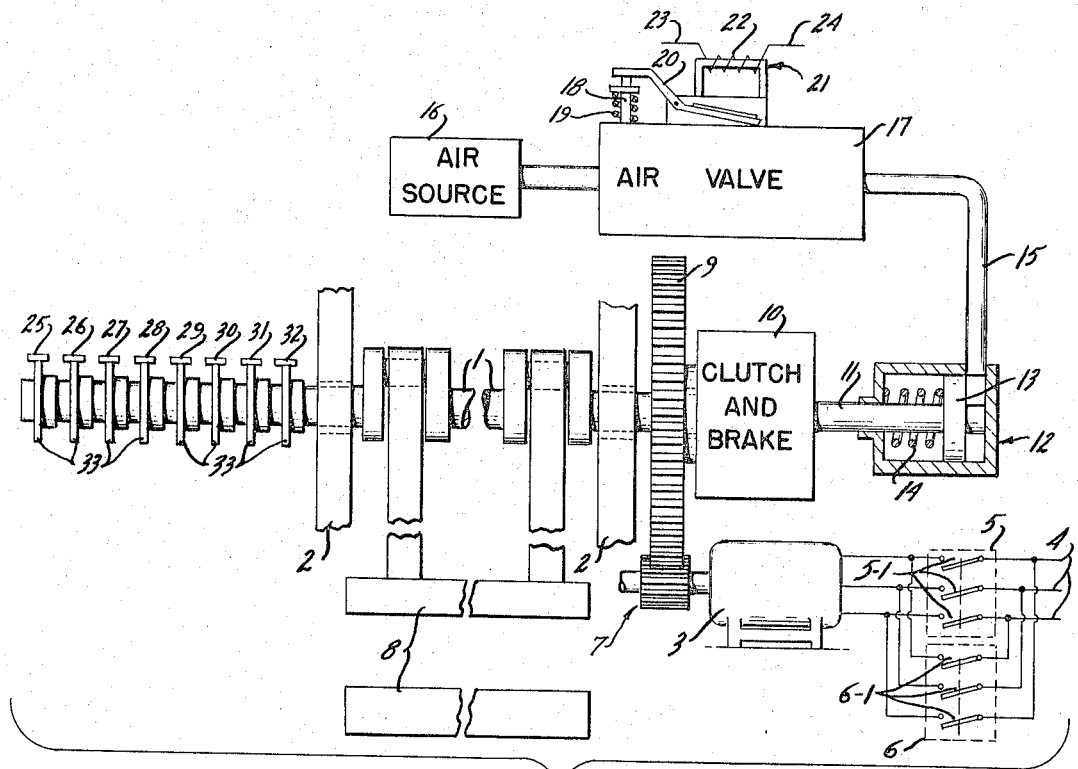
FIG. 1 is a diagrammatic representation of a press and operating components.

Referring to the drawings and particularly to FIG. 1, a part of a press mechanism is diagrammatically shown for the unit. A main crank or drive shaft 1 is shown journaled in spaced bearings 2 forming a part of the supporting structure of the press unit, not otherwise shown. A drive motor 3 is coupled to shaft 1 and selectively energized from suitable three phase power lines 4 through contacts 5–1 of a forward run contactor 5 or contacts 6–1 of a reverse run contactor 6. The motor 3 drives a gear train 7 to rotate the shaft 1 and cyclically open and close a two piece die assembly 8, shown diagrammatically with a lower fixed member and an upper vertically moving member. An output gear 9 of the gear train 7 is rotatably journaled on the shaft 1 and interconnected by a clutch and brake unit 10, shown in block diagram with a proper legend applied. Such structure is well known in the prior art and no further detailed illustration thereof is deemed necessary. Generally, however the unit 10 includes suitable elements interconnected to a piston rod 11 of a pneumatic or hydraulic control 12. Rod 11 is secured to a control piston 13 which is retracted by a spring 14. In the retracted position, a brake grips the shaft 1 and positively holds the press in a stopped position. When the piston 13 and the attached rod 11 are projected forwardly or extended against the bias of spring 14, the brake is released and the rotation of gear 9 is transmitted to the shaft 1 by the clutch portion of unit 10. A releasing force is applied to the back side of the piston 13 from an air line 15 which is connected to a suitable pressure air source 16 by a suitable air valve 17. The valve 17 includes a main valve and the pilot valve of a known construction which is adapted to selectively interconnect the source 16 to the line 15; for example, as in U.S. Patent 2,902,052, which issued on Sept. 1, 1951. A pilot valve operator 18 projects upwardly in FIG. 1 and is urged in an outward position by a suitable spring 19 or the like. An armature 20 of an electromagnetic control unit 21 overlies the operator 18. A winding 22 of unit 21 is electromagnetically coupled to the armature 20 and connected into a suitable control circuit such as that shown in FIG. 2 to selectively control the operation of the press unit by selective application of air to the cylinder 12 as hereinafter described. Thus, when the winding 22 is energized, the main valve is opened by air and delivers air pressure through the line 15 to the control 12 to couple motor 3 to press shaft 1.

Figures 2, 5:
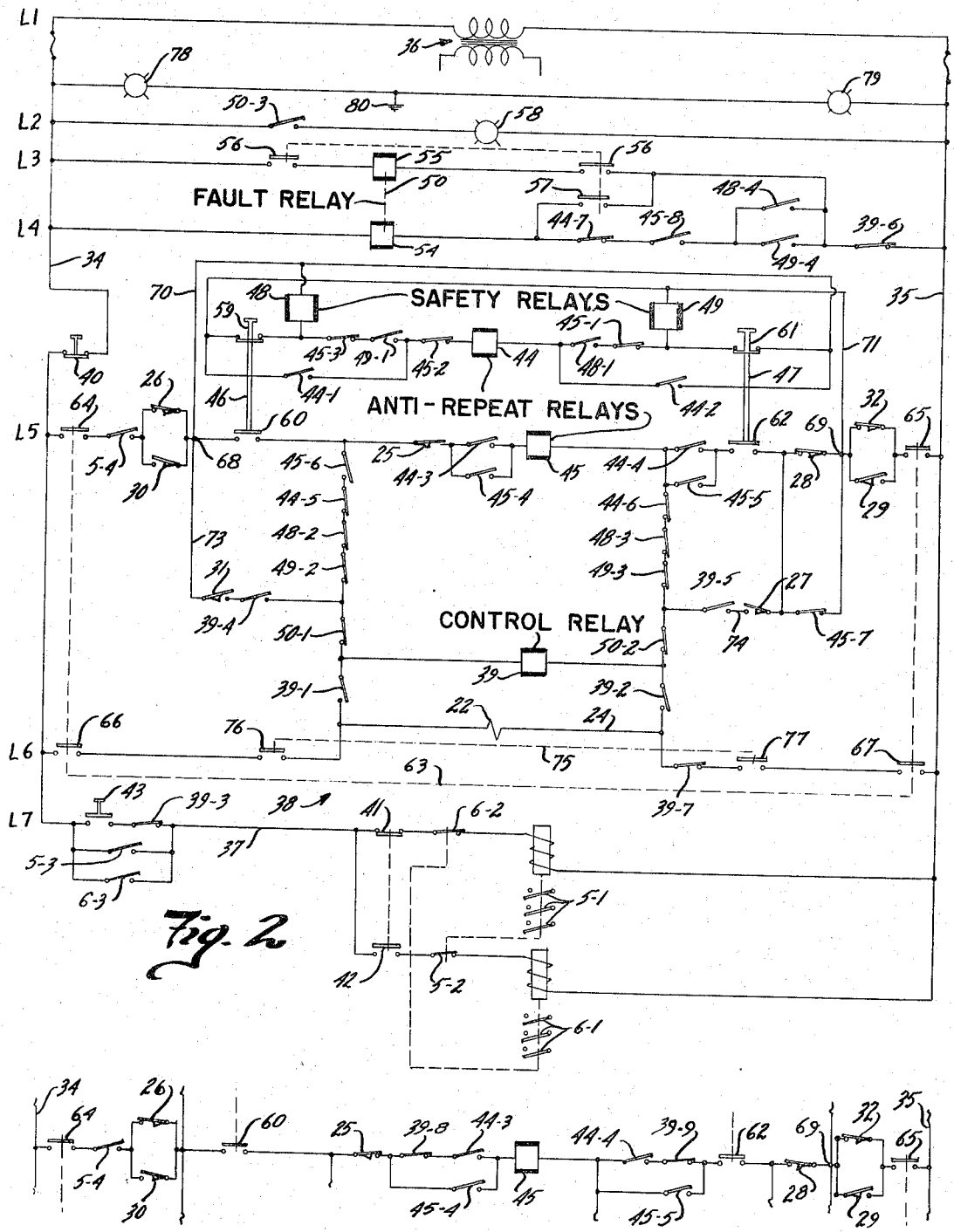
FIG. 2 is a schematic control circuit for a single operator press such as shown in FIG. 1.
FIG. 5 is a schematic circuit showing a modification to the circuit of FIG. 2 to prevent hopping of the press.

Winding 22 is shown connected to incoming or power lead connections 23 and 24 with the winding and the lead similarly numbered in FIG. 2 to relate the subject matter between the two figures.

Figure 4:
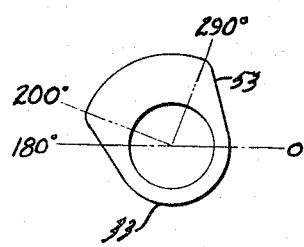
FIG. 4 is an elevational view of a cam for operating one of the limit switches shown in FIGS. 1 and 2.

In FIG. 1, a cam switch assembly is shown diagrammatically coupled to the shaft 1 for simultaneous positioning or actuation in accordance with the angular position of the shaft 1. The illustrated unit includes a plurality of eight switches 25–32, inclusive. Each of the switches is individually actuated by a similarly constructed cam 33 which is coupled to the shaft 1 for simultaneous rotation. The cams are formed with a selected peripheral configuration such as shown in FIG. 4 and hereinafter described to cause selective operation of the switches 25–32 to provide an interlocking control as hereinafter described. In most practical units, the cams and the cam operated switches or contacts are not formed as an integral part of the press but will take the form of an interlocking limit switch which is mechanically connected to the shaft 1 through any suitable means, not shown.

Limit switches 25–32, inclusive, the winding 22 and the contactors 5 and 6 are interconnected to a control circuit which generally constitutes the subject matter of the present invention. A one operator press control circuit suitable for controlling the unit of FIG. 1 is shown in FIG. 2.

Referring now to FIG. 2, a pair of incoming control power leads 34 and 35 is connected to a suitable source of power through a control transformer 36. Generally, the illustrated control circuit may be separated into a main motor circuit branch or portion 37 which includes the contactors 5 and 6 and an auxiliary or a control circuit 38 which includes a main press control relay 39 interconnected to control the winding 22 of the valve 17. A main stop button switch 40 is connected in the lead 34 to the power side of the main motor circuit branch 37 and the control circuit 38. Switch 40 is normally closed and can be opened to completely disconnect power from the motor and from the control circuit to stop the press.

In the following description of FIG. 2, the several lines connected to the power lead 34 are numbered L–1 through L–7 successively beginning at the top of the circuit for reference purposes in the following description. Further, the several contactors or relays are appropriately numbered and their associated contacts are similarly numbered but distinguished by added numbers 1, 2, etc.

The main branch circuit 37 constituting the line L–7 in FIG. 2 includes contactors 5 and 6 connected in parallel between the leads 34 and 35. A first direction switch 41 is connected in series with contactor 5 and a second direction switch 42 connected in series with contactor 6. The switches 41 and 42 are interlocked, as shown by the dashed line, such that opening of one closes the other and vice versa whereby only one or the other of the circuits can be closed. The contactors 5 and 6 control the associated motor control contacts 5–1 and 6–1 for selective connection of the motor to the power lines 4 for forward and reverse rotation respectively. Further, the cntactors 5 and 6 control respective contacts 5–2 and 6–2 interconnected with the opposite contactor 6 and 5.

A main motor start button switch 43 is connected in series with the parallel circuits of the contactors 5 and 6 and is connected in series with a set of normally closed contacts 39–3 of the main press control relay 39. Relay 39 must be de-energized to close contacts 39–3 when the motor 3 is first started. Consequently, initial starting of the motor is prevented when operatively engaged to the shaft 1. Normal open latching contacts 5–3 and 6–3 of the respective contactors 5 and 6 are connected in parallel with the series circuit of the switch 43 and the contacts 39–3 to latch a contactor 5 or 6 in circuit until it is broken through operation of the key operated selector switches 41 and 42 or the switch 40.

The control circuit 38 for the main press relay 39 includes a pair of anti-repeat relays 44 and 45 interconnected for sequential energization and de-energization to establish completion of an energizing circuit to relay 39. The relays 44 and 45 are further interconnected in the control circuit by a pair of push button switch units 46 and 47 and a pair of safety relays 48 and 49. The switch units 46 and 47 are arranged so that the operator must manually push or depress a button with each hand and with his hands and body out of the danger zone of the press in order to initiate and maintain energization of the anti-repeat relays and thereby the main press control relay during the press working stroke. The anti-repeat relays 44 and 45 further require that the operator must release and again depress the associated switches before the die assembly motion can be restarted after it is once stopped. As a result, if either button or switch is tied or otherwise fastened down, repeat operation cannot be effected for reasons more fully described hereinafter.

A fault relay unit 50 is connected to the power leads 34 and 35 to the power side of the top of the switch 40 and is interconnected with contacts of the safety relays 48 and 49 and the anti-repeat relays 44 and 45. The fault relay is actuated as a result of certain malfunctioning of the control circuit and positively holds the press circuit open until manually reset through a supervisory control personnel or the like.

In summary, the contacts of the relays 39, 44, 45, 48 and 49 are interconnected with each other and with the push button run switch units 46 and 47 and the limit switches 25–32, inclusive, to provide a control circuitry which is designed to provide a positive maximum protection to the operators of the dies and the associated machinery against accidental motion of the press or die assembly resulting from short circuit wiring, jumping of contacts and defective or malfunctioning components during the cyclic operation of the press assembly.

Figure 3:
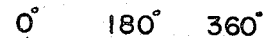
FIG. 3 is a diagrammatic representation of the position and conditions of the several limit switches shown in FIG. 2 to more clearly describe the functioning of the circuit.
Figure 3:
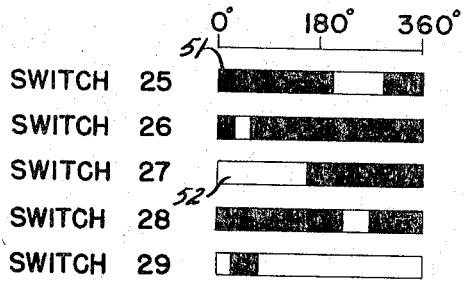
Figure 3:

The limit switches 25–32 are actuated by a cam 33 to provide the open and closed circuit conditions which are diagrammatically charted in FIG. 3. The block diagrams for each of the switches are shown with the appropriate switch number immediately adjacent the corresponding block diagram. In each of the blocks, the solid black portions 51 indicate a closed switch position whereas the clear portions 52 indicate a switch open position. Thus, switch 25 is shown closed from approximately 0° to 200°, open from 200° to 290° and again closed from 290° to 360°. The switches are normally biased to the closed position and in any suitable manner, such as internal biasing springs or the like, not shown, and are held open through engagement with the periphery of the associated cam 33. For example, referring to FIG. 4, a cam 33 is shown having a periphery for positioning of the switch 25. The illustrated cam has a circular outer periphery adapted to engage the switch 25 and hold it open. The cam includes a 270° cutout portion 53 during which the switch 25 moves under its own bias to the closed position.

The cams 33 for the other switches 26–32 are similarly formed with circular switch engaging portions and release cutout portions, in accordance with the illustration of the respective positions of the switches, as diagrammatically shown in FIG. 3.

The setting and positions of switches 25–32 have been shown in FIG. 3 in two columns with the first column including switches 25–29, inclusive, and the second column including switches 30–32, inclusive. These groups are preferably coupled to shaft 1 through completely separate drive couplings or connections, for reasons hereinafter more fully discussed.

The illustrated fault relay unit 50 is generally of a known construction and includes a trigger or latching coil 54 and a trip or reset coil 55. The coil 54 is coupled to a pair of normally closed contacts 50–1 and 50–2 interconnected to the circuit of the relay 39, as hereinafter described. The contacts are normally closed to allow operation or energization of the main press control relay 39. However, if coil 54 is energized, the contacts 50–1 and 50–2 of unit 50 are opened to prevent the operation of the relay 39. Once actuated, the reset coil 55 must be actuated to reset the contacts to the normally closed position.

In the illustrated embodiment of the invention, interconnected key operated normally open switches 56 are connected one each to the opposite side of the coil 55 in line L–3. The switches 56 are controlled through a key operated mechanism or the like, not shown, and controlled by supervisory personnel or the like. A check reset switch 57 also key controlled is provided for checking of the condition of the fault relay circuit.

When the unit 50 is actuated, the latch coil 54 also controls a set of contacts 50–3 connected in series in line L–2 with a fault lamp 58. The fault lamp 58 is energized when coil 54 is energized to indicate that the control circuit has malfunctioned and why the press has stopped operating.

The control circuit 38 is basically controlled by the push button switch units 46 and 47, each of which is similarly constructed. Thus, switch 46 includes a normally closed switch 59 and a normally open switch 60 interconnected to each other as shown by the dashed lines. Similarly, switch 47 includes interconnected normally closed switch 61 and normally open switch 62. The push button switch units 46 and 47 are interconnected to control the anti-repeat relays 44 and 45 through a common power connection on opposite sides thereof to the main leads 34 and 35 when the press control is set to run position by an operation selection switch unit 63.

The switch unit 63 includes a pair of run switches 64 and 65 connected respectively to the lines 34 and 35 and providing a selective control power takeoff at line L–5. It should be noted that the switch unit 63 further includes inching switches 66 and 67 connected respectively to lines 34 and 35 in line L–6 for manual control of the winding 22.

The run switch 64 of unit 63 is connected in series with one side of parallel limit switches 26 and 30 with the opposite sides thereof connected to form a common control circuit power point 68. The latter switches are shown in the normal position with limit switch 26 closed and switch 30 opened.

A forward contact 5–4 of contactor 5 is also connected between the run switch 64 and the parallel switches 26 and 30 such that the control circuit can be energized only when the motor 33 is energized for forward rotation. The limit switches 29 and 32 are similarly interconnected in parallel between the run switch 65 and a common control circuit power point 69. Switches 29 and 32 are shown in the normal starting position with switch 32 closed and switch 29 held open by the associated cam 33. Thus, when contact 5–4 and switches 64 and 65 are closed, power is supplied to the balance of the control circuits.

The first anti-repeat relay 44 is connected to the power point 68 by a lead 70 which is connected to one side of the safety relay 48 and to the one side of the normally closed run switch 61 of the push button switch 47. The circuit for the relay 44 through the run switch 61 includes a set of normally closed contacts 45–1 of the second anti-repeat relay 45 and a set of normally open contacts 48–1 of the safety relay 48 to the one side of the anti-repeat relay 44. The opposite side of the relay 44 is connected to a set of normally closed contacts 45–2 of the second anti-repeat relay 45, a set of normally open contacts 49–1 of the second safety relay 49 and a third set of normally closed contacts 45–3 of the second anti-repeat relay 45 to the second normally closed run switch 59 and then by a lead 71 to the contact power point 69 and therefrom to the lead 35. Thus, the circuit through the relay 44 is opened by the normally opened safety relay contacts 48–1 and 49–1. The relay 48 as noted is connected to the lead 70 and at the opposite side to the intermediate junction or point between the run switch 59 and the normally closed contacts 45–3 of the relay 45. The relay 48 will therefore normally be energized by a circuit through the run switch 59 to lead 71 and thereby to the alternate power point 69 for connection to lead 35. Thus, it will be energized to close contacts 48–1 and condition that part of the circuit.

Similarly, the safety relay 49 is connected between the lead 71 and the normally closed switch 61 of the push button run switch 47 and it will be energized by the power through the switch 61, relay 49 to line 71 and power point 69 and thereby to the lead 35.

In summary, when the motor 3 is energized by actuation of the main start switch 43, the relay 44 will be energized as long as the safety relay circuit functions properly and the run buttons 59 and 61 are in the normally closed position. Energization of the anti-repeat relay 44 closes a first set of normally open contacts 44–1 connected between leads 71 and the junction of the normally open safety relay contacts 49–1 and the normally closed anti-repeat relay contacts 45–2 such that once energized, a sustaining circuit is established through the contacts 44–1 independently of the normally closed switch 59 for the relay 44 and safety relay 48. The circuit for relay 48 is through the normally open relay contacts 49–1 and the normally closed relay contacts 45–3. Similarly, contacts 44–2 of the relay 44 are connected to the opposite side of the relay 44 to bypass the switch 61, contacts 45–1 and normally open safety relay contacts 48–1 and establish the sustaining circuit for relay 44 and safety relay 49 independently of switch 61. Additionally, the anti-repeat relay 44 closes a third and fourth set of normally open contacts 44–3 and 44–4 connected in series in line L–5 to opposite sides of the second anti-repeat relay 45 and thereby conditions the circuit for the second anti-repeat relay.

Thus, once the circuit has been established by proper starting of the motor through actuation of switch 43 and proper positioning of the selection switch 63, the operator can start the press by depressing of the switch units 46 and 47 to establish the following circuit for the anti-repeat relay 45. The opening of switches 59 and 61 does not disrupt the established condition as a result of the previously described sustaining circuits.

Switch 60 of unit 46 and switch 62 of unit 47 are normally open contacts and they are connected in series with relay contacts 44–3 and 44–4 and the relay 45 between the power points 68 and 69 in line L–5. Switch 60 is connected to the left of relay 45 and switch 62 to the right thereof in FIG. 2. Additionally, this circuit includes the normally closed limit switch 25 to the left of relay 45 and the normally closed limit switch 28 to the right thereof. Switches 25 and 28 are actuated by the press to insure resetting of the control circuit such as to require release of the push button switch units 45 and 46 before a subsequent cycle can be established. Relay 45 when energized, opens the normally closed contacts 45–1, 45–2 and 45–3 in the series circuit for the relay 44. As a result, energization of the relay 45 opens the sustaining circuit to the relays 44, 48 and 49 and de-energizes the circuit to allow the associated contacts to return to the position shown in FIG. 2.

Additionally, anti-repeat relay 45 closes its associated contacts 45–4 and 45–5 which are connected in a latching circuit arrangement with the contacts 44–3 and 44–4 of the first anti-repeat relay 44. If the run buttons 46 and 47 are depressed and the relay 45 energized, relay 45 is held energized independently of the first anti-repeat relay contacts 44–3 and 44–4 on opposite sides of the relay 45. The circuit will then be maintained as long as the run buttons 46 and 47 are depressed and the limit switches 26 or 30 and 29 or 32 are in the closed position.

The relay 45 controls a sixth set of contacts 45–6 connected in an energizing branch circuit for the relay 39, beginning between the switch 60 and the limit switch 25. The circuit includes the normally opened relay contacts 45–6 in series with the normally closed relay contacts of the anti-repeat relay 44 and the two safety relays 48 and 49, as follows. Relay 44 includes contacts 44–5 and 44–6 connected to opposite sides of the relay 39. The relays 48 and 49 include series connected contacts 48–2 and 49–2 to the one side of the relay 39 and the series connected contacts 48–3 and 49–3 to the opposite side of the relay 39. The fault relay unit 50 includes normally closed contacts 50–1 and 50–2 on immediate opposite sides of the relay 39 to complete the series energizing branch circuit, which is connected across the limit switch 25, the parallel contacts 44–3, 45–4 and the relay 45 in line L–5. As a result of the above circuit, the relays 39 and 45 are energized through the closed switches 60 and 62 of the push button switch units 46 and 47 respectively. When either of the buttons is released, the circuit to the respective relays is opened and will immediately stop the press assembly.

The relay 39 includes normally opened contacts 39–1 and 39–2 connected in series with winding 22 across the relay 39. Therefore, when relay 39 is energized and closes the contacts 39–1 and 39–2, the winding 22 will be energized in parallel with relays 39 and 45 to actuate the air valve 17 and transmit air pressure to the control 12. The pressure will move the piston 13 to actuate the clutch and brake unit 10 for coupling of motor 3 to drive the shaft 1.

Referring particularly to FIG. 3, when the crankshaft 1 is rotated approximately 25°, the normally open limit switches 29 and 30 are moved to the closed position for about 40°. They thereby establish a closed circuit in parallel with the normally closed limit switches 26 and 32. At about 35° and during the period contacts or switches 19 and 30 are closed, limit switches 26 and 32 open for about 20° as shown by the diagrammatic illustration in FIG. 3. As more fully disclosed in the previously referred to application of Frank H. Holland, the switches 25–29 are driven as one group and switches 30–32 are separately driven as a second group. Each drive is completely separate and distinct. If the drive to either of the main limit switches 25–29 or the monitor limit switches 30–32 has been broken for any reason, the control circuit is broken and the press is stopped. If both limit switch groups are being properly driven, the press system continues to operate. At about 160° angular movement of the shaft 1 and when the dies have come completely together, the limit switches 27 and 31 close and establish an independent energizing or sustaining circuit to relays 45, 39 and the valve winding 22 to allow release of units 46 and 47. At this point, the dies are completely closed and it is safe for the operator to release the push button switch units 46 and 47. The operator may then do any other necessary operations.

The relays 45 and 39 and the valve winding 22 are kept energized through circuits extending from power points 68, limit switch 31, now closed contacts 39–4 of control relay 39 to a junction point of the contacts 49–2 and the fault relay contact 50–1 to the one side of the relay 39. The opposite side of the circuit is maintained through the fault relay contacts 50–2, a fifth set of normally open contacts 39–5 of relay 39, the limit switch 27, and a lead to the limit switch 28 and to contact power point 69. The valve winding 22 which is connected in parallel with the relay 39 as previously described is similarly energized through contacts 39–1, winding 22 and contact 39–2 in parallel with relay 39. Anti-repeat relay 45 is also energized through contacts of relays 45, 46, 48 and 49 in the initial energizing circuit of relay 39.

The anti-repeat limit switch 25 which is connected to the relay 45 as a part of the paralleled circuit with the relay 39 and winding 22 as shown in FIG. 3 opens at approximately 200°. If neither of the button switch units 46 and 47 has been released, the switch 25 acts to positively drop out the relay 45 which can only be re-energized by releasing of switch units 46 and 47 to close switches or contacts 59 and 61 to re-establish relay 44. Further, the main limit switch 28 which is connected to power point 69 opens shortly thereafter, at approximately 225°. In the event the limit switch 25 has been short circuited or for any reason fails to open, the relay 45 is still de-energized.

If the relay 45 has dropped out prior to actuation of limit switch 28, the associated normally closed contacts 45–7, which are connected in parallel with the limit switch, close to maintain the circuit to relay 39 and winding 22. The switch 28 checks to insure proper operation of relay 45.

If however relay 45 is stuck in the operated position for any reason, the normally closed contacts 45–7 will also then be open. If the press then stops as a result of the opening of limit switch 28, the press cannot be restarted through the operation of the run button switch units 46 and 47. The operation selector must be turned to the inch position and the press assembly moved through the means of the inching circuit to beyond the point where the limit switch 28 recloses, as in the previously referred to Holland application.

If the fault is in relay 45 and contacts 45–8 close, the fault is registered or indicated by fault relay unit 50 as presently described.

The illustrated circuit also guards against accidental or intentional shorting of the normally closed contacts as well as the normally open contacts of switch units 46 and 47 through interlocking relay contacts in the circuit of fault relay unit 50. The fault relay includes the latch coil 54 and the trip coil 55 connected to leads 34 and 35, as follows. The relay coil 54 has its one side on line L–4 connected directly to the power lead 34 and the opposite side connected in series with normally closed contacts 44–7 of the anti-repeat relay 44, normally open contacts 45–8 of the second anti-repeat relay 45 and, in parallel, the safety relay contacts 48–4 and 49–4 of safety relays 48 and 49 to one side of the control relay contacts 39–6 to lead 35. The reset coil 55 is connected in parallel between the line power lead 34 and the relay contacts 39–6 with the reset switches 56 serially connected to opposite sides of coil 54. The check switch 57 is connected between the circuits of coils 54 and 55 with the one side of the switch connected between the one switch 56 and the connection to the contacts 39–6 and the opposite side connected between the relay coil 54 and the normally closed contacts 44–7 in line L–4.

The fault relay unit 50 can be reset or checked by means of a suitable spring centered lock coupled to switches 56 and to switch 57 in any suitable manner, not shown. Thus, when an operating key, not shown, is turned to the reset position, the switches 56 are momentarily closed and energize the reset coil 55 through the normally closed contacts 39–6 of relay 39. The latching operation can be checked by turning of the key to a check position wherein the check switch 57 only will be closed and thereby bypass the respective contacts 44–7, 45–8 and the safety relay contacts 48–4 and 49–4. The lock switch is preferably arranged that the key can only be removed in the off position such that the circuit will be in the position shown in FIG. 2 when the key has been removed. It should be noted that the checking of the fault relay unit 50 further serves as a check on the status or operation of the relay 39 because if the latter is held in the operated position, the contacts 39–6 will be open and prevent energization of the relay coil 54.

The inch control circuit in line L–6 for actuating the press to reset limit switches 25 and 26 includes the selector inch switches 66 and 67 in series with a manually actuated switch unit 75 having a switch 76 in series with switch 66 and a switch 77 in series with switch 67 to the opposite side of winding 22. Additionally, in the illustrated circuit, ground detector lamps 78 and 79 are connected between the leads 34 and 35 with common ground connection 80 interconnected to the opposite sides of the lamps 78 and 79.

In the operation of the circuit, if failure is caused as a result of the second anti-repeat relay 45 to drop out, the latch or trigger coil 54 of the fault relay unit 50 is energized upon release of either or both of the run button switch units 46 and 47. The safety relays 48 and 49 are then energized through the switches 59 and 61 to close contacts 48–4 and/or 49–4 in line L–4. The normally closed contacts 44–7 remain closed as the contacts 45–2 are held open by the defective relay 45 and the normally open contacts 45–8 are closed for the same reason. Contacts 39–6 close as a result of de-energizing of relay 39. The fault relay unit then opens contacts 50–1 and 50–2 in the circuit to relay 39 and prevents further press operation until the trouble has been corrected and the latching relay unit 50 has been reset by means of a key operated switch 56.

If main clutch or control relay 39 malfunctions and fails to drop out as a result of opening of the limit switch 28, the malfunctioning will be detected as follows. The limit switch 28 will open the circuit to the valve winding 22 and result in a stopping of the press. Limit switch 25 will also be open as shown in FIG. 3 and previously discussed. The press must then be actuated by the inch circuit. However, the normally closed relay contacts 39–7 of the relay 39 will be held in the open position as a result of relay 39 malfunction. Actuation of the manual inching switch unit 75 will then be ineffective to operate the press and will indicate the failure of the relay to drop out.

Assuming proper operation of limit switch 25 and dropping out of the relay 45, the slide or die assembly completes its stroke and is stopped at 360° or at the end of one complete cycle as a result of the opening of the main cam limit switch 27 in branch line 74 and monitor limit switch 31 in branch line 73 which are connected respectively to the opposite sides of the air valve winding 22 as well as relay 39.

In the event the normally closed switches 59 or 61 of the switch units 46 and 47 are short circuited, accidentally or intentionally, the corresponding relays 48 and 49 are maintained energized. As a result, when the relay 45 is energized by pressing of the respective switch units 46 and 47, opening of the associated contacts 45–1 and 45–3 will not result in opening of the circuit to the corresponding relays 48 and 49. However, relay 44 will be dropped out as a result of the opening of the contacts 45–2 of the second anti-repeat relay 45. This will result in a closing of the contacts 44–7 in line L–4 in circuit for the coil 54. The associated contacts 48–2 and 48–3 and/or 49–2 and 49–3 prevent operation of the relay 39 and the air valve winding 22. The relay 39 therefore disposes the associated contacts 39–6 in line L–4 in the normally closed position. Since the relays 48 and/or 49 and 45 are energized, the associated contacts 48–4 and/or 49–4 and 45–8 will also be closed and complete the circuit to the latching coil 54 of the fault relay unit 50. This causes normally closed contacts 50–1 and 50–2 in the circuit of relay 39 and winding 22 to open and positively prevent completion of the circuit to the respective windings. Further, the contacts 50–3 of the fault relay unit 50 will close and energize the indicating lamp or light 58 until switches 56 are closed by actuation of the associated key type control or the like.

The present circuit also protects against tampering or shorting of the normally closed switches 59 and 61 as well as providing a safety interlock across the normally open contacts 60 and 62 as presently described. Even a momentary short circuiting of the switch 59 during the downstroke of the press when the operator should have his hands on the push button results in the energizing of the relay 48 and stops the movement of the press and the latching of the relay coil unit 50 in the actuated position to prevent further operation until resetting of the system.

A short circuit across the normally closed switch or contacts 61 of the switch unit 47 similarly operates the relay 49 in the same manner as that just described for relay 48.

If the normally open switch 60 is short circuited and the other switch unit 47 is depressed to close the switch 62, the relay 45 will be energized. The contacts 45–2 in circuit with relay 44 will open the circuit to relay 44 and result in closing of the contacts 44-7 in the circuit of the fault relay coil 54. Relay 48 will still be energized as a result of the run button, contacts or switch 59 to keep the contacts 48-4 closed in the fault relay circuit. The main control safety relay control contacts 48-2 and 48-3 will also be open preventing passage of current to relay 39 and the air valve winding 22. The contacts 39-6 remain closed and result in energizing of the fault relay unit 50.

If the normally open contacts of both run buttons become short circuited, the control will become locked out by the fault relay unit as soon as power is applied to the circuit as follows. As soon as power is applied, relay 44 is energized to close the circuit to the relay 45 through the shorted switches 60 and 62. This results in opening of contacts 45-2 and de-energizing of relay 44 but relays 48 and 49 are maintained energized through the switches 59 and 61 respectively. As a result, in the fault relay circuit, the relay contacts 44-7 are closed as a result of the de-energizing of the relay 44 and the normally open contacts 45-8 are closed as a result of the energizing of the relay 45 and the relay contacts 48-4 and 49-4 are energized as a result of the energizing of the respective relays. As a result, the fault relay unit 50 is energized to positively prevent operation of the press unit and the fault lamp 58 is energized to indicate the necessity for tthe control circuit correction.

It should be noted that the normally closed contacts and the normally open contacts or switches of each switch unit 46 and 47 are connected at opposite sides of the circuit such that any short circuit between wires of the switches or normally closed and the normally open contacts of the corresponding button or unit results in a direct short circuit and a blowing of the fuse shown in leads 34 and 35. Similarly, a short circuited wire between the normally closed contacts or switch of one unit and the normally closed contacts or switch of the other unit will also blow a fuse. Similarly, short circuited wiring between the normal two sets of the open switches 60 and 62 will blow a fuse in leads 34 and 35.

In the illustrated embodiment of the invention, if the normally open switch 60 or 62 becomes short circuited, production can be safely maintained until the trouble is corrected by depressing the switch unit with the shorted contacts and thereafter pressing the other button and holding them in the actuated position. This sequence places the de-energization or dropout of relays 48 and 49 under the control of the respective relay contacts 45-3 and 45-1 respectively. As a result, the relay contacts 48-4 and 49-4 will open prior to releasing or reclosing of the normally closed contacts 44-7. This is true as the relay 44 is dropped out by energization of the second anti-repeat relay 45. Consequently, the latch coil 54 is not energized. The press unit is instantly stopped during the downstroke however by releasing either of the units 46 and 47. If the unshorted switch unit is released, its normally open contacts directly de-energize the coil of the relays 45, 39 and the air valve winding 22. The normally closed contacts energized the associated safety relay to close the associated contacts in the fault relay coil circuit. However, relay 45 has dropped out and the circuit to the latching relay coil 54 is maintained open. If the relay 45 does not drop out however, the fault relay unit 50 will operate and prevent further operation.

If the relay 39 does not drop out, the fault relay unit 50 will not be operated in the above sequence. However, both sides of the circuit to the air valve 22 will have been interrupted as a result of the operation of the safety relay 48 or 49 associated with the released button.

If the shorted button unit is released, relay 45 will not drop out and the operation of the safety relay associated with the released unit will cause its normally closed contacts to open the circuit to the coil 39 and the associated air valve winding 22 thereby stopping the movement of the press assembly. As soon as the relay 39 drops out, the associated contacts 39-6 complete the circuit to the latch coil 54 of a fault relay unit 50 to latch the circuit open and to energize the lamp 58 as previously described, until the system has been reset through the momentary closing of the switches 56.

In summary, a combination of more than one fault is required for accidental operation of the press. Thus, if the contacts of the relays 44, 48, 49 or 50 in the circuit to the relay 39, for one reason or another, becomes locked in the operated position, the press cannot be started because of the normally closed contacts thereof in the circuit to the coil of the relay 39 and the air valve winding 22. Relay contacts 39-6 in the circuit of fault coil 54 in combination with the locking position of contacts of tthe relays 48, 49 and 45 will cause fault relay unit 50 to be energized and operate to lock out the circuit.

If the safety relays 48 and 49, the anti-repeat relays 44 and 45 or the main clutch relay 39 burn out or if there is an open circuit in tthe wiring to any of these relays, the press assembly cannot be started.

Further, if relay 39 is jammed in the actuated position, the slide or press assembly will stop as a result of the release of either of the switch units 46, 47 in the downstroke, the actuation of the stop switch 40 during the upstroke or the cam limit switches 27 and 31 at the end of the press stroke.

Actuation of stop button switch 40 de-energizes the main motor starter as well as the clutch control circuit 38. The opening of the main contactor contacts 5-4 in the connection between the control circuit 38 and the lead 34 positively prevents re-energization of the air valve winding 22 even though the limit switches 27 and 31 are closed.

It is noted that the anti-repeat protection is provided in the circuit of FIG. 2 whenever the press assembly is stopped in any position during the stroke of the press assembly as well as at the very end thereof. Relay 45 must drop out every time the slide or the press assembly is stopped or the fault relay unit 50 will latch in. Further, restarting of the press requires that the relay 45 must be again energized by the releasing of the switch units 46 and 47 to bring in the safety relays 48 and 49 and relay 44 and then again depressed to cut out the respective circuits. If either of the switch units 46 or 47 is tied or otherwise fastened down, its normally closed contacts will be opened preventing operation of the associated safety relay 48, 49 and relay 44 and as a result, operation of the second anti-repeat relay 45.

In many systems, the switch units 46 and 47 are connected into the control circuit 38 through the means of a flexible cord and a plug and receptacle unit. Dummy plugs are provided with the necessary internal jumper leads or connections corresponding to the contacts in the respective run switches to bypass operating stations where an operator is not needed. If a dummy plug is inadvertently plugged into a receptacle on a single operator press as shown in FIG. 2, a serious accident may occur as a result of the short circuiting of all the contacts of the switch units 46 and 47. The present circuit provides protection against such an occurrence through the previously described short circuiting protective circuits.

For maximum safety, the illustrated system is ungrounded and is provided with duplicate contacts to each side of the air valve winding circuit such that if any one contact is shunted because of a double ground, short circuited wiring or failure of the contacts, its companion contact on the other side of the line will still open the circuit. As a result, production is safely maintained with a single ground with its presence indicated by the ground detector lamps 78 and 79. Both lamps will normally burn quite dimly at half voltage. Ground, however, on either side of the line shunts the light on that side turning it off and causes the light on the other side of the line to burn brightly. Ground to both sides of the line will blow a fuse and positively stop the press.

Both sides of the line to the safety relays 48 and 49 and the latching coil 54 are not broken because if a double ground or short circuit occurs in the associated circuit, the fault is a safe one preventing operation of the press. Thus, if the relays 48, 49 or relay 44 are energized by such a fault, the normally closed contacts of the associated relays open and prevent operation of the relay 39 and the air valve winding 22.

The cam switch assembly generally functions as that of the previously referred to copending application of Frank H. Holland. If the cam drive system for either set of switches breaks with the switch 27 or 31 opened, the press assembly will stop when the button units 46 and 47 are released at the bottom of the stroke. The self checking contacts 26 and 29 of the main limit switch unit and contacts 30 and 32 of the monitor switch unit and the stopping contacts 31 and 27 are arranged to opposite sides of the line so that if even a short circuit or double ground occurs simultaneously with a failure of the drive to one of the switches, the slide will stop at top center or slightly beyond it. For example, assume that the drive to one of the limit switches breaks with contacts 27 closed, the power connected immediately following the forward relay contactor contacts 5–4 and the line following limit switch 31, each becomes grounded thereby effecting a shunt of the contacts for limit switches 26, 30 and 31. The press assembly will stop at approximately 35° as a result of the opening of the limit switch 32 which is connected in parallel with the normally open limit switch 29 to the lead 35. There will have been very slight downward travel, at most, and the assembly cannot be restarted as a result of the fault. If on the other hand the opposite side of the circuit is grounded such as between the run selector switch 65 and the parallel limit switch 29 and 32 at one point and the connection or line 74 between limit switch 27 and the contacts 39–5, the parallel contacts 29 and 32, the limit switch 28 and the limit switch 27 are short circuited. The slide will then be stopped at approximately top center as a result of the opening of the limit switch 31 in branch line 73. If the limit switch 25 is opened, the slide cannot be restarted. If the latter switch 25 is closed, the assembly can be restarted but the ground detector lights 78 and 79 immediately warn of the fault condition.

Similarly, if the drive to the monitor limit switch assembly consisting of switches 30, 31 and 32 break with the limit switch 31 closed, the system will protect against the fault as follows. Assume the drive to the above limit switches breaks and the wire to the control circuit at the limit switches 26 and 30 and the line 73 between the limit switch 31 and the contacts 39–4 are grounded resulting in a shunting of the limit switches 26, 30 and switch 31. The limit switch 27 at the opposite side opens and stops the press at top dead center. Although the assembly can be restarted, the ground detector lamps 78 and 79 will be actuated to indicate the fault, as previously described.

If the opposite side of the circuit is grounded at the input connection to the parallel switches 29 and 32 and line 74 between switch 27 and contacts 39–5, the paralleled switches 29 and 32 in series with limit switches 28 and 27 are shunted. The press will stop at approximately 35° as a result of the opening of the limit switch 26, as the limit switch 30 is already opened. The circuit cannot then be re-established.

The circuit therefore provides against many different possible malfunctions of the system and includes a means for positively disconnecting the circuit under most fault conduitions which may require supervisory resetting control.

The illustrated circuit while maintaining maximum safety will permit "hopping" operations wherein continued operation is provided without de-energization of the winding 22 by proper timed actuation of the push button switch units 46 and 47 to maintain maximum production and minimum clutch operation, as follows. Both of the switch units 46 and 47 can be released after the limit switches 27 and 31 have been closed to establish the sustaining circuits to relay 39 and winding 22. After having been released, the switch units 46 and 47 can be depressed any time after the switch 25 opens; that is, in the illustrated embodiment of the invention after the crank shaft 1 has rotated through approximately 200°. If they are depressed after opening of limit switch 25, the press will make a subsequent stroke without stopping at the top of the stroke. This can be continued stroke after stroke, if the dies can be unloaded and reloaded fast enough during the upstroke of the slide.

The circuit operation is briefly summarized in this mode of operation as follows. When the switch units 46 and 47 are released, the safety relay coils 48 and 49 are energized thereby opening the sustaining circuit to the relay 45, which drops out, closes contacts 45–2 and causes energizing of the relay 44, as previously described. If only one of the buttons or switch units 45 and 47 is released, the relay 44 will not operate through the associated safety relay contacts, both of the contacts 48–1 and 49–1 being necessarily closed to trigger the energization of relay 44. Both of the press button switch units 46 and 47 must be simultaneously released therefore to reset the anti-repeat circuit. If the switch units 46 and 47 are depressed prior to opening of the limit switch unit 25, the relay 45 will be re-energized and drop out the safety relays 48 and 49 and the relay 44 as previously described. The relay 45 will drop out again therefore when the limit switch 25 opens and both of the switch button units 46 and 47 must again be released and reset to reset the anti-repeat circuit.

However, when both of the switch units 46 and 47 are released and again depressed only after opening of limit switch unit 25, the relays 48, 49 and the anti-repeat relay 44 will be maintained energized until the limit switch 25 recloses at about 290° to thereby re-energize relay 45. Safety relays 48 and 49 and the first anti-repeat relay 44 are then dropped out as a result of opening of the contacts 45–1, 45–2 and 45–3. Further, since the associated contacts 45–5 and 45–6 are closed, the relay 39 and the air valve winding 22 will be maintained energized through the normally open run button contact switches 60 and 62 after the limit switches 27 and 31 open.

The "hopping" operation may, in certain instances, interfere with the mechanical work handling equipment or with a specific desired operational sequence. The control circuit of FIG. 2 can be readily modified for example as shown in FIG. 5 which illustrates a fragmentary portion of the circuit of FIG. 2 and particularly the circuit connections to line L–6. The balance of the circuit not shown in FIG. 5 can correspond precisely to that shown in FIG. 2. In FIG. 5, relay 39 is provided with additional sets of normally closed contacts 39–8 and 39–9 connected in line L–5. Contacts 39–8 are connected in series with the relay contacts 44–3 with the contacts 45–4 connected in parallel with this pair of series connected contacts. Similarly, the contacts 39–9 are connected to the opposite side of the relay 45 in series with the normally opened contacts 44–4. These contacts open when relay 39 is energized and maintain the circuit to the relay 45 open until relay 39 has been dropped out by actuation of the limit switches 27 and 31 at the end of the stroke. As a result, the press assembly must stop since the air valve winding 22 will also have been de-energized as a result of the opening of the limit switches 27 and 31.

This latter circuit checks the dropout of the relay 39 at the end of every stroke or at any other time the slide is stopped such that the contacts 39–7 in the circuit and 39–3 in the main motor control circuit of line L–7 can be eliminated. The contacts have been maintained in FIG. 5, however, to show that they can or cannot be employed, as desired.

Figure 6:
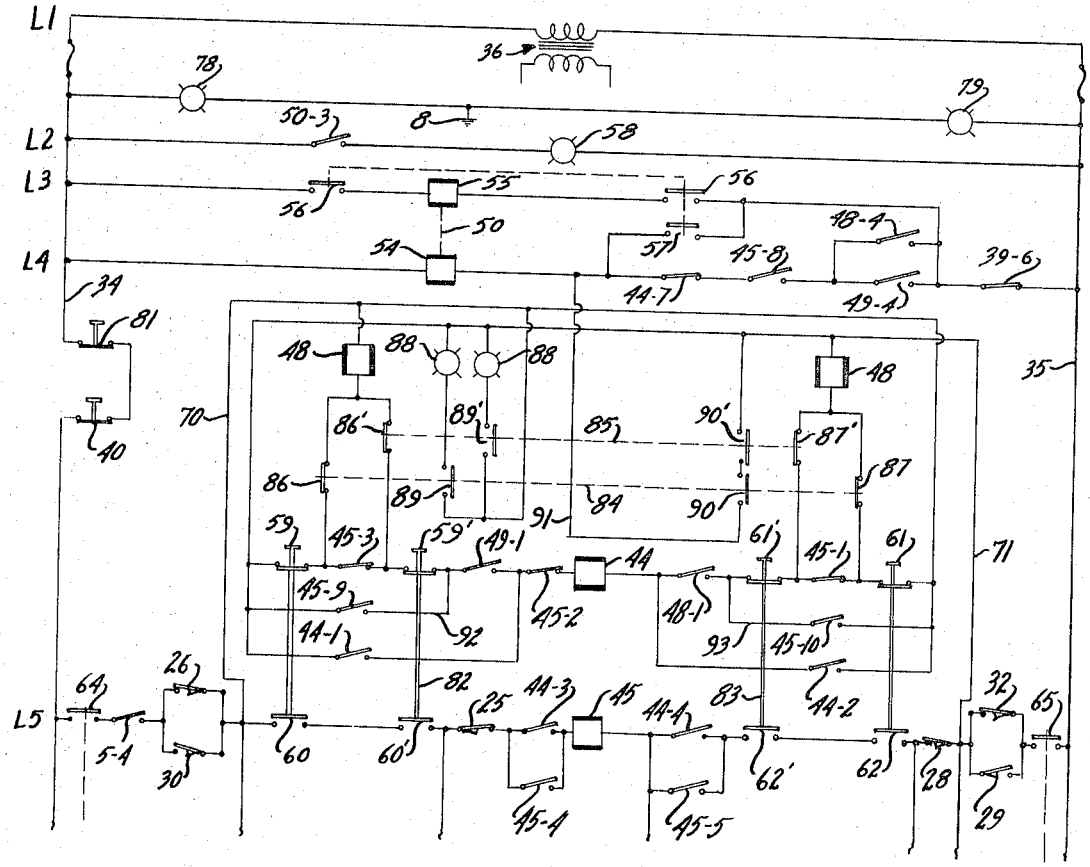
FIG. 6 is a schematic circuit of a portion corresponding to FIG. 2 showing an alternative construction of the present invention for a two operator press control.

The present invention can be similarly applied to multiple station or operator press units. For example, FIG. 6 illustrates a schematic circuit for a two operator control system. The portion of the control circuit for energizing of the anti-repeat relays 44 and 45 is shown and the balance of the circuit may be the same as that otherwise shown in FIG. 2.

A second main stop button switch 81 is connected in the lead 34 in series with the main stop button switch 40 to allow control by both operators. In addition to the switch units 46 and 47, which are hereinafter referred to as front run units in FIG. 6, similar rear run push button switch units 82 and 83 are provided and connected one each on opposite sides of the relays 44 and 45. Corresponding switches of units 46 and 82 and of units 47 and 83 are similarly numbered with a distinguishing prime added to units 82 and 83 for simplicity of the following description.

Switches 59' and 61' of units 82 and 83 are separated from the corresponding switches 59 and 61 by the anti-repeat relay contacts 45-3 and 45-1, respectively.

A pair of key operated selector switch units 84 and 85 is shown interconnecting the safety relays 48 and 49 in the circuit, as hereinafter described, to allow adaptation of the press to either a single or a dual operator control. The switch units 84 and 85 are similarly constructed and the switch unit 84 is hereinafter described with the corresponding elements of the switch unit 85 similarly numbered with primes added to distinguish between the corresponding elements.

The key selector switch unit 84 includes a first switch 86 connected in series between the relay 48 and the junction of the switch 59 and the relay contacts 45-3. The corresponding switch 86' is connected in common to relay 48 but to the opposite side of contacts 45-3.

A second switch 87 of unit 84 is connected between the relay 49 and the junction of the switch 61 and the relay contacts 45-1 with the corresponding switch 87' similarly connected for shorting of contacts 45-1.

A dummy plug lamp 88, indicating the condition of the one station switch unit 84, is connected in series with a third switch 89 of the unit 84. The series circuit is connected directly between the lines 70 and 71 such that closing of the switch 89 energizes the lamp 88 and indicates that the corresponding safety features have been disconnected from the circuit for that set of push button switch units. Additionally, a fourth switch 90 of the switch unit 84 is connected in a line 91 between the line 71 and the one side of the fault relay coil 54 connected to lead 35. Switch 90' of switch unit 85 is connected in series with the switch 90 in line 91 such that if both of the switches 84 and 85 are turned to a dummy switch position, opening the circuits of safety relays 48 and 49, the fault relay coil 54 will be immediately energized to latch open the circuit to the relay 39 and the air valve winding 22. This complete path is from the lead 34, coil 54, line 91 including switches 90 and 90' to line 71 and thereby directly to the lead 35.

The circuit of FIG. 6 is shown with the switches 84 and 85 set to interconnect both of the stations for simultaneous control. As a result, the relays 48 and 49 are energized through switch units 46 and 47 and close contacts 48-1 and 49-1 to energize relay 44, which establishes sustaining circuits through contacts 45-2 as in FIG. 2. The press control circuit is then conditioned to energize relay 45 when all of the push button switch units 46, 47, 82 and 83 are depressed.

Relays 48 and 49 are de-energized by the opening of the normally closed switches of the push button switch units. Relay 45 is energized in the same manner as that described with respect to FIG. 2. Relay contacts 45-2 open and the relay 44 is de-energized, opening the sustaining circuit of FIG. 2. Simultaneously, the contacts 45-6 are closed and the circuit to the relay 39 and the valve winding 22 are completed and the power circuit operates as in FIG. 2.

Release of any one of the switch button units 46, 47, 82 or 83 will result in the immediate stopping of the press unit. Restarting requires that all switch units be released and then again depressed to insure the restart is intentional. If any of the normally closed contacts 59, 59', 62, 61 and 61' are shorted, the press will not operate for the same reasons heretofore discussed with respect to FIG. 2. Thus, if the normally closed contacts of either of the switch units 46 or 47 are shorted, the associated safety relay 48 or 49 will not drop out when the buttons are pressed. If the contacts on the other switch units 82 and 83 are shorted, the associated safety relays will operate when all of the buttons are pressed and relay 45 will come in.

The interlocking circuit for the safety relay 48 in FIG. 6 is however rearranged to stop the press if either of any of the push button switch units 46, 47, 82 or 83 is released, as follows. A normally open set of contacts 45-9 of the relay 45 are connected in a lead 92 in parallel with the switches 59, 59' and the relay contacts 45-3 to the one side of the relay 44. Similarly, a tenth set of contacts 45-10 are connected in a lead 93 in parallel with the switches 61 and 61' and the normally closed contacts 45-1 between lead 70 and the connection of the safety relay contacts 48-1 and the contacts 61'.

When relay 45 is energized, contacts 45-1 and 45-3 open and connect relay 48 in separate circuits with the corresponding switches 59 and 59' and the relay 49 in separate circuits with switches 61 and 61'. The circuit for relay 48 is (1) from lead 70, relay 48, switch 86 of switch unit 84, switch 59 of switch unit 46, or (2) from lead 70, relay 48, switch 86', switch 59', and contacts 45-9 to lead 71. The circuits for relay 49 may be similarly traced between leads 70 and 71. Therefore, releasing of any one of the units 46, 47, 82 or 83, energizes the appropriate safety relay and stops the press. Similarly, shorting of any switch 59 or 61 will stop the press and actuate the fault relay unit 50, as previously described with respect to FIG. 2.

If one or more of the normally opened switches 60, 62, 60' or 62' becomes shorted, the actuation of the other associated push button run switch units results in sequential operation of the relay 44 and the relay 45 and the latching coil 54 to prevent further operation of the circuit. For example, if the switch unit 60 is shorted and not depressed while the other push button switch units are depressed, the relay 45 is again energized. However, relay 48 remains energized through the push button switch 59. The relay 45 will de-energize relay 44. However, relay contacts 48-2 and 48-3 will hold the circuit to the relay 39 and the valve winding 22 open. Further, the fault relay 50 will be latched in an actuated position requiring manual resetting of that circuit. If a short exists across both of the switches 60 and 60', depressing of the opposite buttons to the other side of the relay 45 will result in energizing of the relay 45. However, safety relay 48 will also be in and the fault relay will latch in circuit as described above. If the contacts of all of the four push button switch units becomes shorted, the latching coil 54 of fault relay unit 50 will be energized to prevent press operation.

Production can be safely maintained with the normally open contacts of one or more units shorted, if the shorted unit is pressed initially and prior to actuation of the other three. Releasing a shorted button during the downstroke will stop the press because the normally closed contacts will bring in the associated safety relay and the fault relay unit 50.

If an operator is not required at the rear of the press for example, the switches 82 and 83 can be shorted out and the selector switch unit 85 turned to the dummy plug position. Switch 86' will open the corresponding circuit to the safety relay 48 and the switch 87' will open the circuit to the relay 49 such that the relays will not come in when the additional contacts 45-9 and 49-10 are closed as a result of energizing the anti-repeat relay 45. Switch 89' will close to turn on the amber light 88' and indicate that the selector is in the dummy plug position. The control will then operate in the same manner as the single operator control shown and described in FIG. 2.

Similarly, if the front station is to be removed, the selector switch unit 84 is actuated to reverse the position of the illustrated contacts or switches. A dummy plug will also be provided to short circuit the associated switches 59 and 60, 61 and 62 of the push button units 46 and 47. In this position, the circuit will generally operate as shown with respect to FIG. 2 except that the safety relays 48 and 49 are now dropped out as a result of normally closed push button contact switches 59' and 61' rather than through the action of the relay contacts 45–1 and 45–3. However, a short circuit across either of the normally closed switches 59' and 61' brings in the corresponding safety relay 48 or 49 whenever the contacts 45–9 and 45–10 close. This action will result in energizing of the fault relay unit coil 54.

If both of the selector switch units 84 and 85 are placed in the dummy plug position, the circuit of line 91 is completed through the closing of switches 90 and 90' to provide the direct energization of the latch coil 54 of the relay unit 50, as previously described.

In the circuit of FIG. 6, for emergency operation, production can be maintained with a short circuited normally closed or normally open set of run button contacts if the supervisor or other authorized personnel with a control key turns the associated lock switch with the shorted button to the dummy plug position. The corresponding amber light 80 or 80' will warn that the one station has no short circuit protection. However, both switches cannot be turned to the dummy plug position without disrupting the operation of the system.

Figure 7:
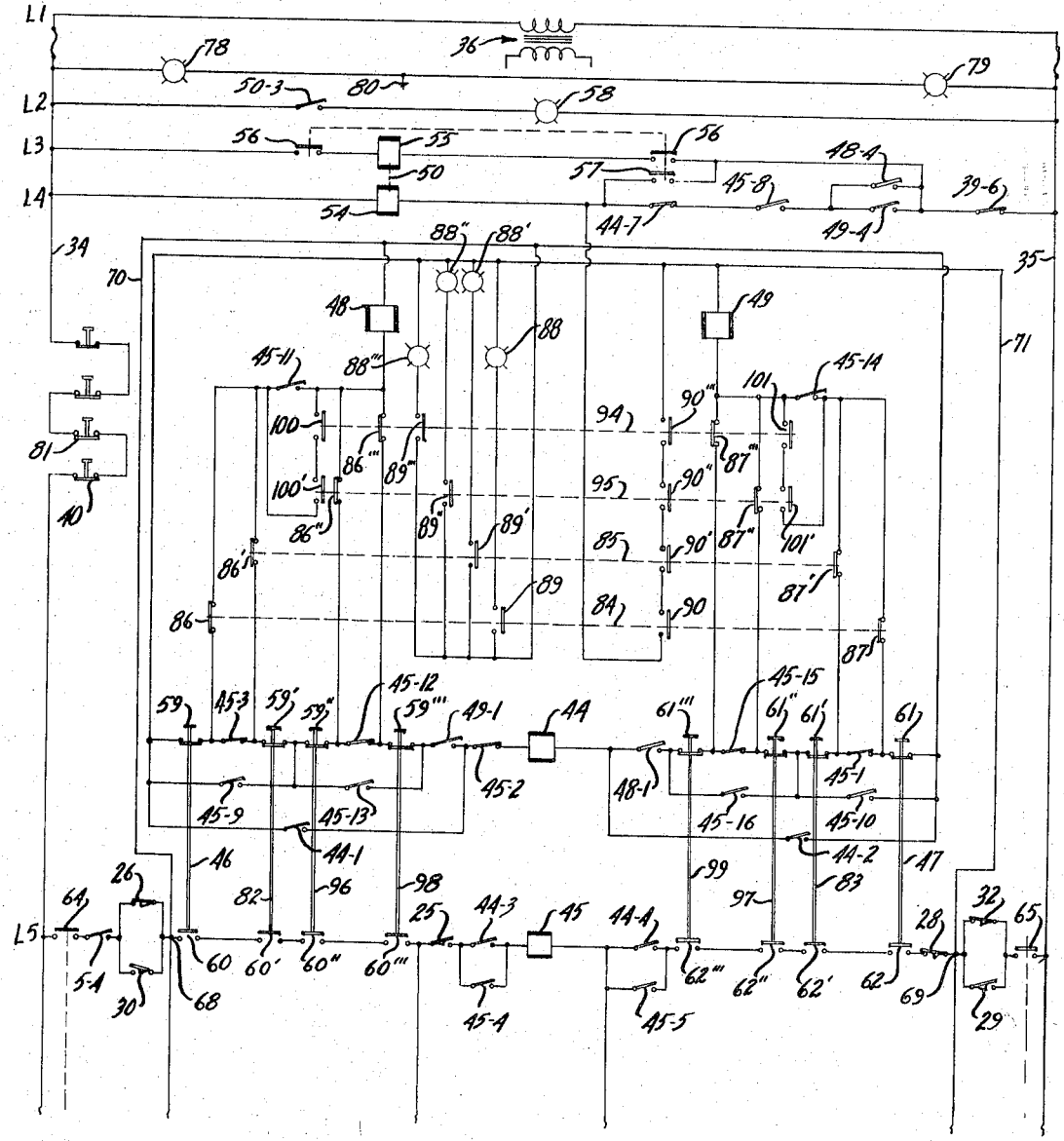
FIG. 7 is a schematic circuit of a portion of the circuit corresponding to that of FIG. 2 modified for a four operator press control.

FIG. 7 illustrates a similar control circuit for a four station operator control. The circuit is identical to the two operator system of FIG. 6 except for the addition of a plurality of contacts controlled by the relay 45 and the necessary interconnecting contacts of an additional pair of selector switch units 94 and 95 and two additional push button run switch units 96, 97, 98 and 99 in the circuit of the antirepeat relays 44 and 45 and the safety relays 48 and 49'.

Corresponding elements of FIGS. 6 and 7 are correspondingly numbered. Similar elements of switch units 94–99 and the corresponding switch units of FIG. 6 are similarly numbered and double and triple primed for simplicity of description.

Selector switch units 94 and 95 are similar to units 84 and 85 with the exception of additional switches 100 and 101 in unit 94 and similar switches 100' and 101' in unit 95. These additional switches are connected in circuit with relays 48 and 49, respectively, for selective insertion and removal of the additional push button switches. The push button switch units are paired as 96–97 and 98–99 to be operated by two additional operators, with one of each pair connected to one side of relay 44 and the other of each pair connected to the opposite side thereof.

The push button switch units 46 and 82 are connected substantially the same in FIGS. 6 and 7 except that the connection to the safety relay 48 is either through a set of normally open contacts 45–11 of the anti-repeat relay 45 and/or through normally open switch 100 and 100' of the additional selector switch units 94 and 95. With the selector switches 94 and 95 in the illustrated position for inserting the third and fourth operator control, switches 100 and 100' are open and disconnect relay 48 in the initial circuit. The switches 86" and 86"' of units 94 and 95 however connect relay 48 into the circuit of anti-repeat relay 44, as follows.

The push button switch units 96 and 98 are connected between the push button switch unit 82 and the safety relay contacts 49–1 and serially include the switches 59" and 59"' separated by an additional set of normally closed contacts 45–12 of anti-repeat relay 45. A set of normally open contacts 45–13 of relay 45 is connected across the switches 59" and 59"' and contacts 45–12, similar to the connection of contacts 45–9 across switches 59 and 59' and the separating anti-repeat relay contacts 45–3.

Generally, the push button switch units 97 and 99 are similarly connected to the right side of relay 44 in FIG. 7 by the switches 101 and 101' of units 94 and 95 and by the additional contacts 45–14, –15 and –16.

The circuit of FIG. 7 functions in the same manner as FIG. 6, except that the additional switch units 96–99, inclusive, must be actuated with units 46, 47, 82 and 83 to cycle the press or like device. The selector switch units 94 and 95 permit elimination of one or both of the added controls in the same manner as units 84 and 85.

In operation, safety relays 48 and 49 and relay 44 are energized when the press is started and motor 3 energized for forward rotation and contacts 44–1 and 44–2 close to establish the sustaining circuits for relay 44. Relay 48 is energized through the switches 86" and/or 86"' and contacts 45–12 to switch 59" of unit 96, switch 59' of unit 82, normally closed contacts 45–3 and switch 59' of unit 46 to lead 71. Relay 49 is similarly energized and closes contacts 49–1 to establish a second circuit to relay 48 through switch 59"' of push button switch unit 98, contacts 49–1 and contacts 44–1. When push button switch units 46, 47, 82 and 83 and 96–99, inclusive, are all depressed, the relay 45 is energized and closes contacts 45–11 to connect relay 48 in circuit with switches 86 and 86' of the selector switch units 84 and 85. Relay 45 opens the contacts 45–3 and 45–12 to establish separate branch circuits for relay 48, each of which includes switches of the corresponding selector and push button switch units, as follows: (1) contacts 45–11 switch 86 and switch 59 to lead 71; (2) contacts 45–11 switch 86', switch 59' and contacts 45–9 to lead 71; (3) switch 86", switch 59" and contacts 45–9 to lead 71; and (4) switch 86"', switch 59"', contacts 45–13 and contacts 45–9 to lead 71.

Relay 49 is similarly connected. Therefore, release of any push button switch unit actuates either relay 48 or 49 and stops the press if it is in a dangerous portion of the stroke.

Any other number of push button switch units can be provided by interconnecting additional branch circuits to the safety relays through the normally closed contacts of the respective switch units and operatively inserting them into the circuit by relay 45 or the like.

The circuit of FIG. 7 responds to malfunctioning of the apparatus as heretofore discussed as well as to intentional or accidental shorting of any one or any combination of the several closed and open switches of the push button units. The selector switches permit the use of the well known "dummy plug" to effectively short circuit the contacts or switches of the units to be disconnected.

The circuit of FIG. 7 includes the dummy plug positioning lamps and the separate fault relay interlock similar to FIG. 6 but including additional contacts or switches of the switch units 94 and 95 similarly interconnected with the corresponding elements of switch units 84 and 85.

The illustrated circuits can be modified within the scope of the present invention as defined by the accompanying claims. Thus, the second anti-repeat relay may be provided with paralleled windings each of which control certain of the illustrated contacts. Continuous run switches may be provided to provide for continuous press operation for example as a part of the run selection switch unit 63.

The present invention thus provides an improved press control system which protects against intentional and accidental changes in the wiring system as well as malfunctioning of the control.

Various modes of carrying out the invention are contemplated as being within the scope of the following claims particularly pointing out and distinctly claiming the subject matter which is regarded as the invention.

We claim:
1. In an electrical control circuit for cyclical operation in response to a switching means,
   a main electrically actuated control means connected in an energizing circuit,
   anti-repeat cycle means including a plurality of interlocking electrically actuated anti-repeat means connected to control the main control means, said interlocked anti-repeat means requiring sequential operation including a first anti-repeat means having contacts connected in the energizing circuit of the control means and connected in the energizing circuit of the control means and connected in an energizing circuit including contacts of a second anti-repeat means, the second anti-repeat means connected in a second energizing circuit including contacts of the first anti-repeat means and having contacts in the energizing circuit of the main electrically actuated control means whereby the first anti-repeat means is energized to energize the second anti-repeat means and serves to deenergize and reset said first anti-repeat means and thereby to conjointly control the energization of the control means,
   cycling means connected for simultaneous movement and including a first switch means connected in the energizing circuit of the first anti-repeat means and a second switch means connected in the energizing circuit of the second anti-repeat means, said switch means being interlocked for simultaneous movement whereby only one of said switch means is closed at any one time,
   electrically actuated safety means connected in an energizing circuit including said first switch means and including contacts connected in the energizing circuit of the first anti-repeat means and the control means, and
   electrically actuated fault means conjointly controlled by all of said electrically actuated means and including means preventing energization of said control means.

2. The control circuit of claim 1 wherein
   said fault means is latched in the actuated position, and a manually actuated release means is coupled to reset the fault means.

3. The control circuit of claim 1 wherein said fault means includes
   a first electrically actuated means responsive to operation to disable said control means,
   a mechanical latch means to hold said fault means in an operated position,
   a second electrically actuated means to release said mechanical latch means and reset said fault means, and
   code actuated switch means for selectively actuating said second electrically actuated means.

4. In an electrical control circuit for cyclically actuating a press and the like having a working stroke and a release stroke,
   a main control relay having an energizing circuit,
   a plurality of interlocked anti-repeat relays having contacts in said energizing circuit connected to control the main control relay, said interlocked anti-repeat relays being interconnected in a control circuit to establish a sequential operation including a first of said relays being energized to energize a second of said relays, the second of said relays upon being energized by said first relay de-energizing the first relay, the contacts of said relays in said energizing circuit then being set to conjointly actuate the control relay,
   manually operated switch means connected for simultaneous movement and each including a normally closed switch connected in circuit with the first anti-repeat relay to establish energization of the first anti-repeat relay with the second relay de-energized and a second normally open switch connected in circuit with the second anti-repeat relay for energization of the second anti-repeat relay upon closing of the second switch with the first anti-repeat relay energized, and
   safety relay means including contacts controlling energizing of the first anti-repeat relay and the control relay, said safety relay means being connected in an energizing circuit through said normally closed switch of the manually operated switch means.

5. The control circuit of claim 4 wherein
   said switch means includes switches disposed on opposite sides of first and second anti-repeat relay,
   said safety relay means includes a pair of safety relays connected one each in an energizing circuit with one of the normally closed contacts of a corresponding one of said switches and includes a pair of normally open contacts in the energizing circuit of and to the opposite side of the first anti-repeat relay, and
   said second anti-repeat relay includes separate contacts controlling said safety relays and said first anti-repeat relay.

6. The control circuit of claim 4 wherein
   said switch means includes a plurality of switch units each having a normally closed switch and a normally open switch interconnected for simultaneous movement to an open and closed position, a similar number of said switch units being connected to opposite sides of said anti-repeat relays with the normally closed switches serially connected with said first anti-repeat relay and the normally open switches serially connected with the second anti-repeat relay,
   said safety relay means having a pair of safety relays connected one each in an energizing circuit with the normally closed switches to the opposite sides of the first anti-repeat relay, and
   means responsive to energization of said second anti-repeat relay to establish a plurality of branch energizing circuits, each including a different one of said normally closed switches.

7. A latching circuit comprising,
   a first and second relay means, each relay having a plurality of normally open and normally closed contacts in the de-energized state of the relay,
   an operator push button switch means having a normally open and a normally closed switch in the unactuated state of the switch means,
   a safety relay means connected in circuits including said switches and contacts and including a first energizing circuit including a normally closed switch of the push button switch means and a second circuit including normally closed contacts of the second relay means and normally open contacts of the first relay means, said first relay means being connected in an energizing circuit with the normally closed switch of the push button switch means and normally open contact of the safety relay means and in a sustaining circuit including a normally closed contact of the second relay and a normally open contact of the first relay means,
   said second relay means being connected in an energizing circuit with the normally open switch of the push button switch means and a normally open contact of the first relay means for energization upon depression of the push button switch means and in a sustaining circuit including a normally open contact of the second relay means, and
   said first relay means and said safety relay means energized until said second relay means is operated to open its normally closed contact in the sustaining circuit of the first relay means.

8. A circuit for controlling energization of a work device comprising, a first and second anti-repeat means, a first and a second safety relay means and a main control relay means, each relay having a plurality of normally open and normally closed contact means in the de-energized state of the corresponding relay, a pair of operator push button switch means each having a normally open and a normally closed switch means in the unactuated state of the corresponding switch means, each of said safety relay means connected in an energizing circuit including a corresponding normally closed switch means and in a sustaining circuit including contacts of the second anti-repeat relay means and normally open contacts of the first anti-repeat relay means, said first anti-repeat relay connected in an energizing circuit including the normally closed contact of the push button switch means and in a sustaining circuit including contacts of the second anti-repeat relay and normally open contacts of the first anti-repeat relay means, upon depression of the operator push button, the second anti-repeat relay connected in an energizing circuit including the normally open contacts of the push button switch means and a normally open contact of the first anti-repeat relay means and a sustaining circuit including energized by a normally open contact of the second anti-repeat relay means, the control relay means connected in an energizing circuit including the normally open contacts of the push button switch means and normally closed contacts of the first anti-repeat relay means and the first and second safety relay means and a normally open contact of the second anti-repeat relay means, and the device connected in an energizing circuit including the push button normally open contacts in parallel with the control relay means in series with contact means of the control relay means.

9. The control circuit of claim 8 having
a fault relay means having contacts serially connected to opposite sides of the control relay means, said fault relay means being energized through contacts of said anti-repeat relay means and said control relay means and said safety relay means.

10. The control circuit of claim 8 wherein
said fault relay means is latched in an actuated position and includes separately controlled reset means, and
said fault relay means is energized through a series circuit including normally closed contacts of the first anti-repeat relay means, normally open contacts of the second anti-repeat relay means, paralleled normally open contacts of the first and second safety relay means, and normally closed contacts of the control relay means.

11. The control of claim 10 wherein the fault relay means includes
latch winding connected in series circuit with said contacts,
the reset means includes a reset winding,
reset switch means connected in series with the reset winding across the latch winding and the contacts of the safety and anti-repeat relay means, and
a check switch is connected in parallel with the contacts of the safety and anti-repeat relay means.

12. A circuit for energizing a work device to provide a cyclical operation machine comprising,
a first and a second anti-repeat relay, a control relay, a safety relay and a fault relay, each relay having a plurality of normally open and normally closed contacts in the de-energized state of the corresponding relay,
an operator push button switch means having a normally open and a normally closed switch in the unactuated state of the corresponding switch means, said safety relay connected in an energizing circuit including said normally closed switch of the push button switch means and in a sustaining circuit including contacts of the second anti-repeat relay and normally open contacts of the first anti-repeat relay, said first relay connected in an energizing circuit including the normally closed switch of the push button and in a sustaining circuit including a normally closed contact of the second contactor and the same normally open contact of said first anti-repeat relay as said safety relay, the second anti-repeat relay connected in an energizing circuit including the normally open switch of the push button switch means and a normally open contact of the first anti-repeat relay for energization upon depression of the push button and in a sustaining circuit including its own normally open contacts, the control relay connected in an energizing circuit including the normally open switch of the push button switch means, normally closed contacts of the first anti-repeat relay and of the safety relay and of the fault relay and a normally open contact of the second anti-repeat relay, the device connected in an energizing circuit including the normally open switch of the push button switch means, normally closed contacts of the first anti-repeat relay and the safety relay and the fault relay and a normally open contact of the second anti-repeat relay and the control relay, and a first normally open machine operated limit switch is set to close at a safe point in a cycle of operation of the machine to connect the source to energize the control relay and the work device directly through a normally open contact of the control relay and a closed contact of the fault relay.

13. The circuit of claim 12 including
a plurality of additional machine operated switches to reset said second anti-repeat relay and to insure proper operation of the limit switches.

14. A latching circuit for cyclical operation of a device comprising
a first and a second anti-repeat relay, a control relay, a first and second safety relay and a fault relay, each relay having a plurality of normally open and normally closed contacts,
a pair of operator push button switch means each having a normally open and a normally closed switch,
the first safety relay being energized through the normally closed contacts of the first operator push button switch means,
the second safety relay being energized through the normally closed contacts of the second operator push button switch means,
said fault relay being energized through contacts of all other relays and arranged to respond to selected malfunctioning thereof,
said first anti-repeat relay connected in an energizing circuit with each side being serially connected with normally closed contacts of one of said push button switch means, normally closed contacts of the second anti-repeat relay and normally open contacts of a safety relay and having sustaining circuits to each side thereof of its normally open contacts shunting the corresponding energizing circuit contacts,
a normally closed contact of said second anti-repeat relay being connected between one of the sustaining circuits and the relay,
said second anti-repeat relay energized from the source through the normally open contacts of the push button switch means and normally open contacts of the first anti-repeat relay and having a sustaining circuit containing one of its normally open contacts in parallel with the contacts of the first anti-repeat relay,
said control relay being energized upon depression of said push button switch means through the normally open switches thereof and contacts of both said anti-repeat relays and said safety relays and said fault relay, said control relay having a sustaining circuit through a normally open limit switch and its own normally open contacts and normally closed contacts of the fault relay, and said device being actuated in parallel with the control relay and through normally open contacts of the control relay.

15. The latching circuit of claim 14 having
a device actuated limit switch serially connected in the circuit of the second anti-repeat relay for de-energizing the same once each cycle, and
a set of normally closed contacts of said control relay connected in series with the normally open contacts of the first anti-repeat relay in the circuit of the second anti-repeat relay.

16. The latching circuit of claim 15 having
selector run switch means for controlling a power connection to said relay and said device, and
an inching circuit connected by said run switch means to separately actuate the device completely independently of said control circuit.

17. The latching circuit of claim 16 having
means conditioning said device for operation in response to operation of said relays, said means being operable independently of the condition of said relays.

18. The latching circuit of claim 14 wherein,
said fault relay is energized through a normally closed contact of the first anti-repeat relay and of the control relay and normally open contacts of the second anti-repeat relay and said safety relays, said safety relay contacts being connected in parallel with each other and in series with said other contacts.

19. The latching circuit of claim 18 wherein,
said fault relay is mechanically latched in an actuated position and includes a reset coil connected in an actuated position and includes a reset coil connected in an energizing circuit with normally closed contacts of the control relay and a manually operable reset switch.

20. In an electrical control circuit for cyclical operation in response to a switching means, a main electrically actuated control means, anti-repeat cycle means including a plurality of interlocking electrically actuated anti-repeat means connected to control the main control means, said interlocked anti-repeat means requiring cyclical operation whereby a first thereof must be energized to energize a second thereof and then the first must be de-energized to actuate the control means and the second of said anti-repeat means must be energized by said first anti-repeat means to de-energize and reset said first anti-repeat means and to conjointly actuate the control means, a plurality of cycling means connected for simultaneous movement and each including a first switch means connected to condition the first anti-repeat means for energization and a second switch means connected to condition the second anti-repeat means for energization, said switch means being interlocked whereby only one of said conditioning is produced at any one time, electrically actuated safety means connected in a plurality of branch circuits in the input circuit of the anti-cycle means and including contacts controlling energizing of the first anti-repeat means and the control means, switch means for selectively connecting and disconnecting said plurality of branch circuits, and fault means connected to said switch means and actuated when said switch means opens all of said branch circuits.

21. The circuit of claim 20 wherein
said fault means is connected in an alternate energizing circuit including circuit switching means actuated by said safety means, and
means actuated by said fault means to prevent actuation of said control means.

References Cited by the Examiner
UNITED STATES PATENTS 2,962,634 11/1960 Griffin _____ 317—139
3,183,377 5/1965 Holland _____ 317—135 X MILTON O. HIRSHFIELD, *Primary Examiner.*

LEE T. HIX, *Examiner.*

D. YUSKO, *Assistant Examiner.*

UNITED STATES PATENT OFFICE
CERTIFICATE OF CORRECTION

Patent No. 3,311,794                                March 28, 1967

Frank H. Holland et al.

It is hereby certified that error appears in the above numbered patent requiring correction and that the said Letters Patent should read as corrected below.

Column 4, line 55, for "cntactors" read -- contactors --; column 13, line 24, for "connected" read -- connection --; line 67, for "conduitions" read -- conditions --; column 19, lines 12 and 13, strike out "and connected in the energizing circuit of the control means".

Signed and sealed this 25th day of June 1968.

(SEAL)
Attest:

Edward M. Fletcher, Jr.                          EDWARD J. BRENNER

Attesting Officer                                  Commissioner of Patents